Figure 1:
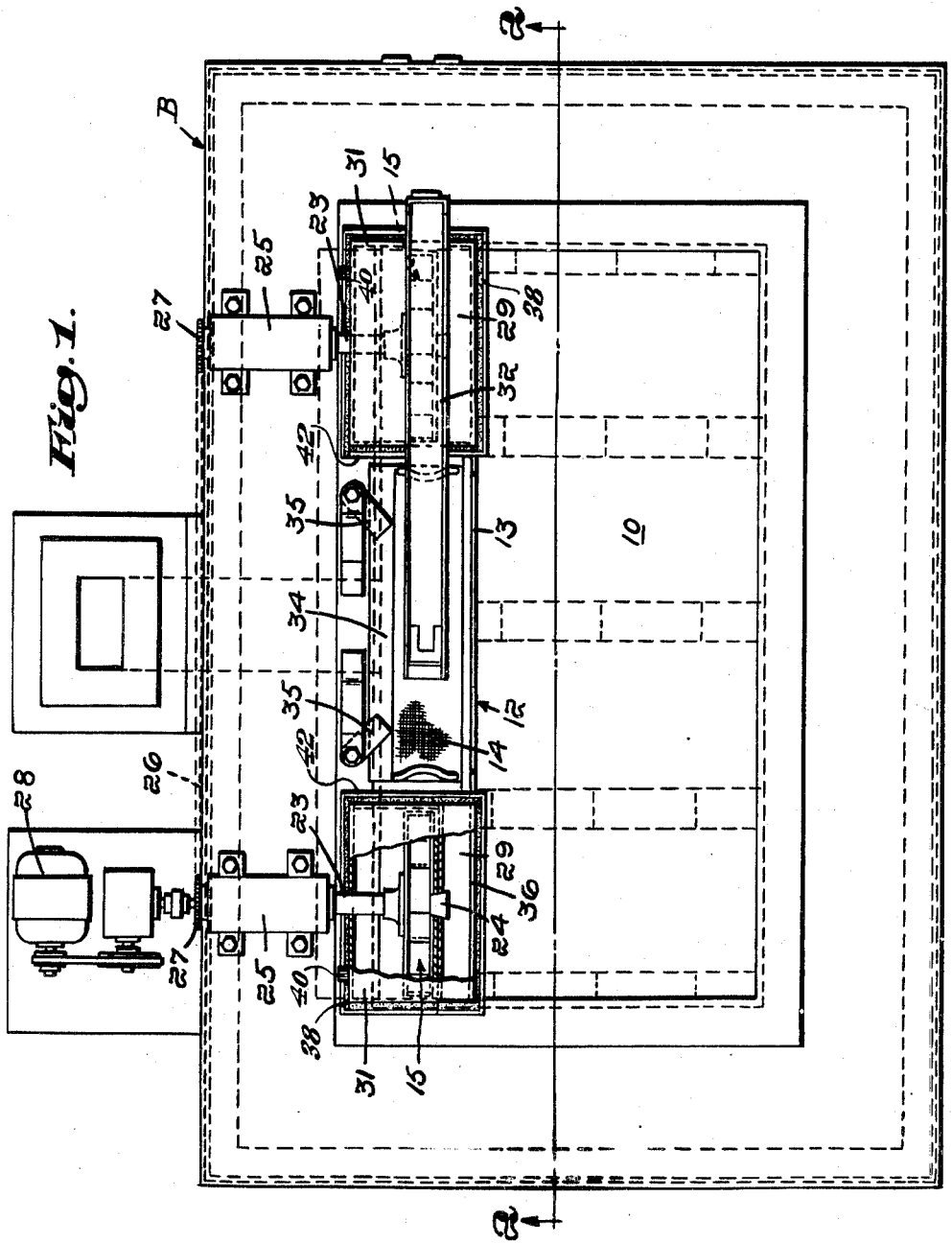

Dec. 25, 1951  G. G. WARREN  2,579,634
MOLTEN BATH FURNACE
Filed May 7, 1949  3 Sheets-Sheet 1

Dec. 25, 1951 G. G. WARREN 2,579,634
MOLTEN BATH FURNACE
Filed May 7, 1949 3 Sheets-Sheet 3

Gilman G. Warren Inventor:
By Kinney, Jenney, Witter & Hildreth
Attorneys

Patented Dec. 25, 1951

2,579,634

UNITED STATES PATENT OFFICE 2,579,634

MOLTEN BATH FURNACE

Gilman G. Warren, Braintree, Mass., assignor to American Electric Furnace Inc., Boston, Mass., a corporation of Massachusetts Application May 7, 1949, Serial No. 91,893

2 Claims. (Cl. 266—33)

This invention relates to molten bath furnaces, and has particular reference to improvements in soldering furnaces of the type which include a pot to contain molten solder into which the articles to be soldered are dipped.

In ordinary furnaces of the type mentioned the level of the solder in the pot varies more or less constantly due to removal of a certain amount of the solder with the articles and to the supply of replenishing solder to the pot. Moreover, in connection with such furnaces, there usually is employed an article supporting and dipping mechanism which cannot practicably be vertically adjusted to compensate for variations in the level of the solder in the pot to insure desired uniform depth of dipping of the articles. As a result, the depth of dipping the articles has not heretofore been uniform but has varied, sometimes with insufficient soldering of the articles and at other times with excessive soldering of the articles and waste of solder. Accordingly, the primary object of the present invention is to provide, in a furnace of the type mentioned, simple, practical means to maintain the solder in the pot at a constant level such as to insure ample depth of dipping of the articles for proper soldering of the same and yet to avoid excessive depth of dipping of the articles with consequent waste of solder.

To insure best soldering of articles in a furnace of the type mentioned it is important to maintain the solder in the pot at a substantially uniform temperature. Accordingly, another and important object of the present invention is to provide a constant level maintaining means which serves also to maintain the solder in the pot at a substantially uniform temperature.

Another important object of the invention is to provide, in conjunction with the present constant-level, uniform-temperature maintaining means, simple, practical means to strain surface dross from the solder and to concentrate or collect the dross in a readily removable container for removal with the latter from the furnace. Also in this connection excessive oxidation has been encountered in the past in solder furnaces, and therefore, it is an object of this invention to substantially eliminate excessive oxidation due to exposure of solder and the like to the atmosphere.

With the foregoing and other objects in view, which will become more fully apparent as the nature of the invention is better understood, the same consists in a soldering furnace embodying the novel features of construction, combination and arrangement of parts as are illustrated by way of example in the accompanying drawings and as will be hereinafter more fully described and claimed.

Figure 2:
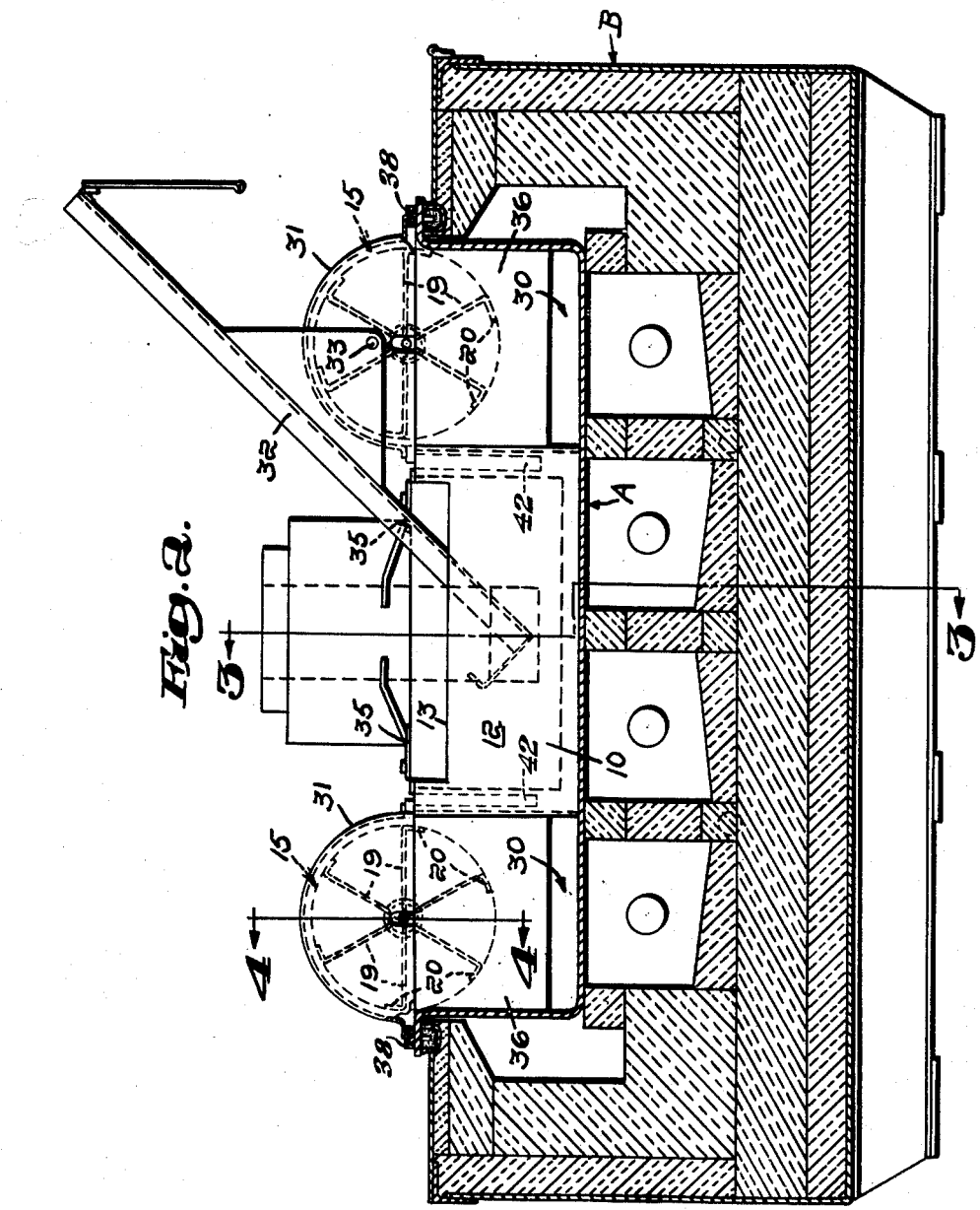
Figure 3:
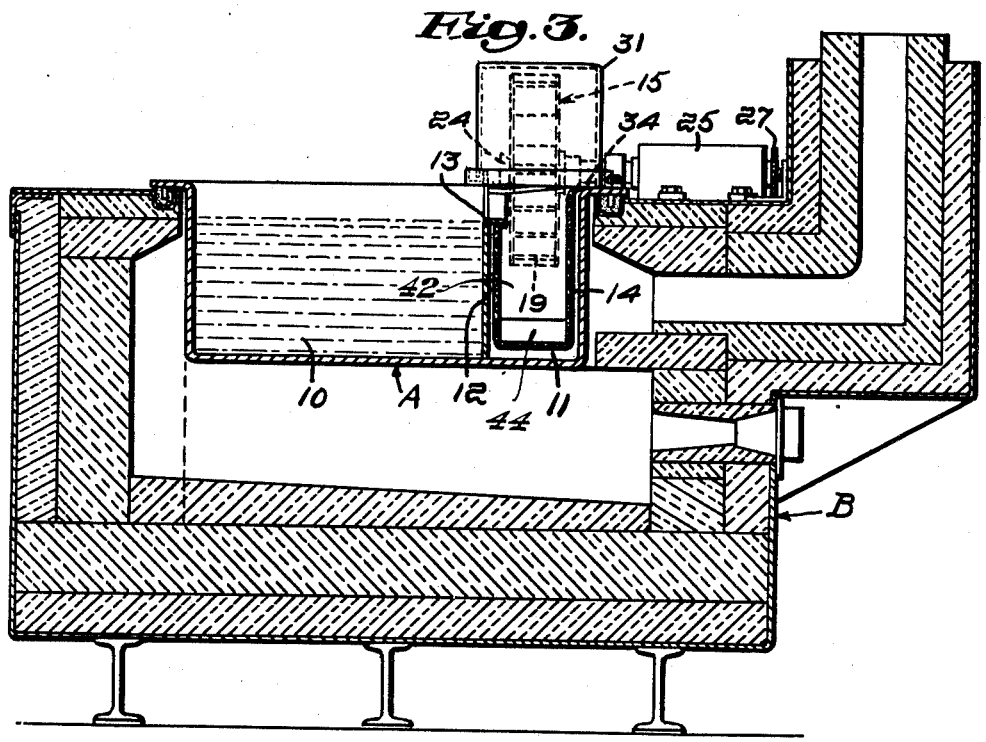
Figure 4:
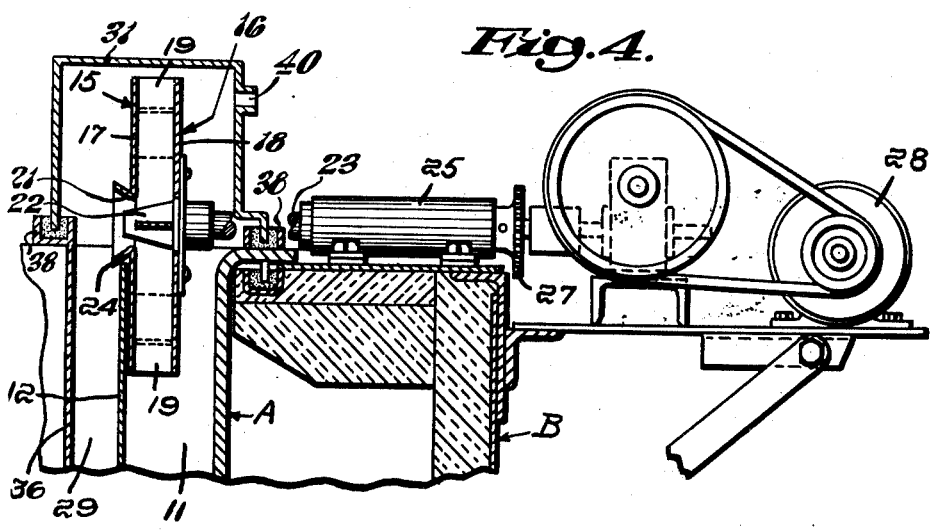

In the accompanying drawings, wherein like characters of reference denote corresponding parts in the different views:

Fig. 1 is a top plan view of a soldering furnace constructed in accordance with the invention, Fig. 2 is a longitudinal section through the furnace taken approximately on the line 2—2 of Fig. 1, Fig. 3 is a transverse section through the furnace taken approximately on the line 3—3 of Fig. 2; and Fig. 4 is an enlarged cross section taken on the line 4—4 of Fig. 2.

Referring to the drawings in detail, A designates, generally, a soldering furnace pot constructed in accordance with the invention and B designates, generally, a heat insulating furnace structure enclosing and supporting said pot.

In accordance with the invention, the contents of the pot A may be heated either electrically or by gas burners or in any other suitable or desired manner. In this connection, the furnace illustrated by way of example in the drawings, is of a generally well known type in which the pot A and its contents are designed to be heated by gas burners.

In the drawings the pot A is illustrated as being of elongated, rectangular shape as viewed in plan. It may, however, be of any other suitable shape and may, of course, be of any desired size. In any event, it is composed of a dipping chamber 10 and a reservoir chamber 11 into which it may be divided by a partition or division wall 12, as shown. Or, equivalently, and if desired, said chambers 10 and 11 may be separate and distinct from each other.

The chambers 10 and 11 are disposed in side to side relationship to each other and preferably, but not necessarily, extend longitudinally of the pot A from end to end thereof. Both are designed, of course, to contain molten solder.

At preferably, but not necessarily, a medial location along its length, the partition or division wall 12 between the chambers 10 and 11 is cut away at its top to provide a weir 13 over which molten solder may flow from the dipping chamber 10 into the reservoir chamber 11. Thus, as long as sufficient solder is supplied to the dipping chamber 10 to cause a flow of solder from said dipping chamber over the weir 13 to the reservoir chamber 11, the level of the solder in said dipping chamber 10 manifestly will be maintained substantially at the level of said weir 13.

Disposed in the reservoir chamber 11 to receive molten solder flowing over the weir 13 from the dipping chamber 10 to the reservoir chamber 11, is a foraminous basket or container 14 which may be of any suitable construction and which is readily removable from said reservoir chamber 11. Thus, any dross floating on or contained in molten solder flowing from the dipping chamber 10 over the weir 13 to the reservoir chamber 11, will be trapped in the basket or container 14 and at suitable times may be removed with said basket or container. In this way the solder in the dipping chamber 10 may be maintained practically free of dross.

In accordance with the invention, one or more pumps 15 is, or are, employed to deliver sufficient molten solder from the reservoir chamber 11 to the dipping chamber 10 to maintain a flow of molten solder from said dipping chamber 10 over the weir 13 to said reservoir chamber 11, thereby to maintain the level of the solder in said dipping chamber 10 constantly at substantially the level of said weir 13.

Regardless of whether only a single pump or a plurality of pumps 15 is, or are, employed in any particular instance, the same may be of any suitable construction and may be located where desired. Moreover, if a plurality of said pumps should be employed, they may be duplicates of each other.

A pump suitable for the purpose stated may comprise, as best illustrated in Fig. 4 of the drawings, a rotor, designated generally as 16, composed of front and rear disks 17 and 18, respectively, connected together in spaced apart relationship to each other by a plurality of radial vanes 19 the outer end portions 20 of which extend suitable distances annularly, all in the same direction, relative to said rotor.

In the front disk 17 is a central opening 21, while extending forwardly from the central portion of the rear disk 18 into said opening 21 is a conical member 22 against which the inner ends of the vanes 19 abut and to which said vanes preferably are secured as by welding or in any other suitable manner. Thus, it will be apparent that if the rotor is disposed with its axis extending horizontally and with its lower portion submerged in a liquid, and if said rotor then is rotated in the direction in which the outer end portions 20 of the vanes 19 extend from said vanes, the latter will be caused to act successively as dippers each to dip up and to elevate a quantity of the liquid. It will further be apparent that as each vane rises toward and beyond a horizontal position, the liquid elevated by the same will gravitate or flow inwardly therealong toward and against the conical member 22 by which it will be deflected forwardly through the central opening 21 in the front disk 17.

To the rear disk 18 is suitably secured a supporting and driving shaft 23 for the pump 15, while extending forwardly from the front disk 17 in surrounding relationship to the central opening 21 therein is a flange 24 by which liquid delivered through said opening is conveyed forwardly beyond said front disk 17.

The furnace illustrated in the drawings is shown, by way of example, as being equipped with two pumps 15 of the type described for taking solder from the reservoir chamber 11 and for delivering it to the dipping chamber 10. Said pumps are disposed at opposite sides, respectively, of the weir 13 so that each operates to take molten solder from a related end portion of the reservoir chamber 11 and to deliver it to the related end portion of the dipping chamber 10, which is a particularly desirable arrangement inasmuch as it insures advantageous circulation of practically all of the solder in the chambers 10 and 11.

The shaft 23 of each pump 15 is journaled in a bearing 25 mounted on the furnace structure B and in this way each pump rotor 16 is mounted with its lower portion extending to a suitable depth into the reservoir chamber 11. The two shafts 23 may be suitably connected together as by means of a sprocket chain 26 extending over sprocket wheels 27 on said shafts 23 so that both pumps may be driven by a single motor 28 connected to one of the shafts 23, as shown. Or, if desired, the pumps may be separately driven.

The rotor 16 of each pump is disposed adjacent to the partition or division wall 12 between the chambers 10 and 11 and also parallel to said wall. Moreover, said partition or division wall 12 is suitably formed to provide in conjunction with a front wall 36, an open-top well 29 in front of each of the pump rotors 16 which well does not communicate with the reservoir chamber 11 and which communicates only at its bottom, through an opening 30, with the bottom portion of the dipping chamber 10. The flange 24 of each pump overlies the open top of the related well 29 so that solder pumped by each pump is delivered into the related well 29. It will thus be apparent that when the pumps 15 are in operation, each pump elevates molten solder from the related end portion of the reservoir chamber 11 and delivers the solder elevated by the same to the related well 29, from the bottom of which it flows, through the opening 30, to the bottom of the dipping chamber 10. Consequently, there is no surface disturbance of the solder in the dipping chamber 10 by supply of solder to said chamber from the reservoir chamber 11. Moreover, due to the bottom supply of solder to the dipping chamber 10 and to the arrangement of the pumps 15 with respect to the weir 13 so that practically all of the solder in said dipping chamber is maintained in gentle circulation, a desirable substantially uniform temperature of the solder in said dipping chamber is insured.

Preferably, replenishing bar solder is supplied only to the reservoir chamber 11 so that it is melted before it reaches the dipping chamber 10. In this connection and as a practical means of supplying bar solder to the reservoir chamber 11, a trough 32 is provided to receive bar solder and is pivotally mounted intermediate its ends, as indicated at 33, as, for example, upon one of the covers 31, so that it is tiltable between a horizontal, bar receiving position and an inclined position in which the discharge end thereof is disposed in the basket or container 14. Thus, after a bar of solder has been placed in said trough and the latter has been inclined, the bar of solder will gravitate into the molten solder in the basket or container 14 at a rate depending upon the rate of melting of the bar. The replenishing supply of solder thus will be desirably gradual and any dross therefrom will immediately be trapped in the basket or container 14.

As the pumps elevate the solder allowing it to fall onto the conical members 22, a large surface area of the solder will normally be exposed to atmosphere causing excessive oxidation. In order to reduce this to a minimum, however, I provide covers 31 extending over each pump and being sealed all around at their lower margins in sand seals 38. In order to further prevent atmosphere from entering into the area of the pumps, I provide a wall 42 extending downward into the reservoir 11 from the respective inner walls of the said pump covers. The wall 42 only extends part way down into the reservoir chamber, as shown in Fig. 3, leaving a passage 44 for solder to pass thereunder. Thus covers 31 provide a relatively air-tight chamber surrounding the pumps with the exception of possibly a slight leak in the area where the shafts 23 pass through the rear walls of said covers 31. Each cover 31 is provided with an inlet opening 40 for the purpose of supplying relatively inert gas to the chambers surrounding the pumps. Such gas may be any conventional non-oxidizing gas, or even the products of combustion of the furnace itself. Thus excessive oxidation during the pumping phase is substantially eliminated.

To retain the basket or container 14 properly disposed in the reservoir chamber 11 behind the weir 13, said basket or container may be provided at its rear side, at or near the top thereof, with a flange 34 to overlie a portion of the furnace structure B, and pivoted keepers 35 may be provided to be swung over said flange to hold the same against said portion of the furnace.

As will be understood, the pumps 15 are operated at no greater rate than to maintain a gentle flow of solder over the weir 13 from the dipping chamber 10 to the reservoir chamber 11, thus to maintain a substantially constant level of the molten solder in the dipping chamber 10. Moreover, it will be appreciated that in this way the solder in the dipping chamber 10 will be maintained at a constant level regardless of variations in the level of the solder in the reservoir chamber 11.

From the foregoing description considered in connection with the accompanying drawings, it is believed that the construction and operation of a soldering furnace constructed in accordance with the present invention will be clearly understood and its advantages appreciated. It is desired to point out, however, that while only a single, specific structural embodiment of the invention has been illustrated and described, the same is readily capable of specifically different structural embodiments and for use in molten baths of substance other than solder, such as molten salts, lead, copper, bronze, etc., while still remaining within the spirit and scope of the invention, as defined in the appended claims.

I claim:
1. In a molten bath furnace, a dipping chamber to contain molten material, a separate reservoir chamber to contain said molten material, means for overflow of said molten material from said dipping chamber to said reservoir chamber to predetermine the maximum depth of said molten material in said dipping chamber, a well in communication only at its bottom with the bottom portion of said dipping chamber and not in communication with said reservoir chamber, and pump means operable to elevate said molten material from said reservoir chamber and to deliver it to said well for passage through the latter to the bottom of said dipping chamber to maintain an overflow of said molten material from said dipping chamber to said reservoir chamber, thus to maintain said molten material in said dipping chamber, at a substantially constant level, without disturbance of the surface of said molten material in the dipping chamber.

2. In a molten bath furnace having a dipping chamber and means for melting material contained therein, means for maintaining a constant bath level and a tranquil bath surface comprising a reservoir for molten material adjacent to the dipping chamber, a weir between the dipping chamber and the reservoir over which excessive molten material flows from the dipping chamber into the reservoir, a well adjacent to the reservoir and the dipping chamber and communicating with the dipping chamber through an opening below the level of the weir, pump means adapted to elevate the molten material in the reservoir and convey it to said well whereby such molten material will pass into the dipping chamber below the surface level of the molten material in the dipping chamber, and means covering said well, pump means, and part of the reservoir for the elimination of oxidizing atmosphere in the area where the molten material exposes a large surface area.

GILMAN G. WARREN.

REFERENCES CITED

The following references are of record in the file of this patent:

UNITED STATES PATENTS

| Number | Name | Date |
|---|---|---|
| 1,220,211 | Feldkamp et al. | Mar. 27, 1917 |
| 1,522,765 | Wilke | Jan. 13, 1925 |
| 1,725,960 | Jones | Aug. 27, 1929 |
| 2,034,794 | Brunberg | Mar. 24, 1936 |
| 2,166,251 | Herman | July 18, 1939 |